(12) United States Patent
Seiler et al.

(10) Patent No.: US 6,938,460 B2
(45) Date of Patent: Sep. 6, 2005

(54) METHOD FOR CONDUCTING AN INTEGRITY TEST OF FILTER ELEMENTS

(75) Inventors: Roger Seiler, Basle (CH); Jügen Van Den Boogaard, Bovenden (DE); Magnus Stering, Bougival (FR)

(73) Assignee: Sartorius AG, Gottingen (DE)

( * ) Notice: Subject to any disclaimer, the term of this patent is extended or adjusted under 35 U.S.C. 154(b) by 0 days.

(21) Appl. No.: 10/434,143

(22) Filed: May 8, 2003

(65) Prior Publication Data

US 2003/0234211 A1 Dec. 25, 2003

(30) Foreign Application Priority Data

Jun. 18, 2002 (DE) ......................................... 102 27 160

(51) Int. Cl.⁷ ........................ G01N 15/08; G01N 33/00
(52) U.S. Cl. ........................... 73/38; 73/866; 210/323.1
(58) Field of Search .................... 73/38, 40, 866; 210/741, 90, 92, 323.1, 323.2

(56) References Cited

U.S. PATENT DOCUMENTS

| | | | | |
|---|---|---|---|---|
| 4,872,974 A | * | 10/1989 | Hirayama et al. | 210/90 |
| 5,507,959 A | * | 4/1996 | Glick | 210/797 |
| 5,594,161 A | * | 1/1997 | Randhahn et al. | 73/38 |
| 5,616,828 A | * | 4/1997 | Kuczenski | 73/38 |
| 5,786,528 A | * | 7/1998 | Dileo et al. | 73/38 |
| 6,377,171 B1 | * | 4/2002 | Fewel | 340/522 |
| 6,666,970 B1 | * | 12/2003 | Jornitz et al. | 210/650 |

FOREIGN PATENT DOCUMENTS

DE         4339589 C1 * 12/1994         ......... G01N/15/08

* cited by examiner

*Primary Examiner*—Hezron Williams
*Assistant Examiner*—Tamiko Bellamy
(74) *Attorney, Agent, or Firm*—Anthony J. Casella; Gerald E. Hespos

(57) ABSTRACT

A method is made available for conducting an integrity test of filter elements (3), in particular of sterile filters. The integrity test involves direct measurement, at constant pressure, of a liquid flow on the inflow side of the filter element (3) to be tested. The test method is practically independent of changing environmental conditions, provides a result which is not distorted by a change of pressure on the inflow side of the filter element, and permits a very short measurement time.

5 Claims, 3 Drawing Sheets

METHOD FOR CONDUCTING AN INTEGRITY TEST OF FILTER ELEMENTS

BACKGROUND OF THE INVENTION

The present invention relates to a method for testing the integrity of filter elements, in particular of filter elements for sterile filtration.

In many areas of technology, particularly in the pharmaceutical industry, but also in foodstuff production, the electronics industry, etc., filtration systems are used for sterile filtration of gases and liquids. For sterile filtration, sterile filters with membranes made of various polymers are used. For sterile filtration of gases and for sterile aeration of containers, in particular in the pharmaceutical industry, sterile filters with membranes based on polytetrafluoroethylene (PTFE; Teflon®) are used as standard nowadays.

To comply with the regulatory requirements set by different countries and, for example, also the requirements of current Good Manufacturers Practice (cGMP) and the criteria of Technical Report 26 of the Parenteral Drug Association (PDA) of the USA, the integrity of the filtration systems is periodically tested before and/or after filtration and/or after sterilization with sterile pure steam, in order thereby to guarantee filtration safety and product safety. Depending on the nature and the area of application of the filter membranes, the integrity tests include the diffusion test, the pressure-holding test, the bubble point test and the water intrusion test (WIT) which are also approved in the pharmaceutical sector, with the special safety requirements existing in said sector in respect of sterile filtration. The aforementioned, nondestructive test methods correlate with destructive challenge tests, what are referred to as bacteria challenge tests (BCT) in which the degree of bacterial retention is determined using standard test microbes and standardized test methods (ASTM 838–83).

In the use of hydrophobic sterile filters or hydrophobic membranes, for example in the sterile filtration of gases or in the sterile aeration of containers, the integrity of the membranes is nowadays mostly tested with the aid of the water intrusion test.

The water intrusion test (WIT) is a test method in which the capillary depression on a surface which cannot be wetted with water, i.e. a hydrophobic surface, is measured and evaluated. This nondestructive test method provides information on the diameter of the pore structure present within the membrane matrix to be tested. As has been mentioned, the integrity test values determined in this way are correlated with a destructive bacteria challenge test (BCT).

In the sterile filtration of liquids with hydrophilic sterile filters or hydrophilic membranes, the integrity test is in most cases carried out with the aid of the diffusion test. This is also a nondestructive test method in which the diffusion of a gas through a liquid located in the pores of a wetted membrane is measured and evaluated. Here too, information is provided on the diameter of the pore structure present in the membrane, and the determined integrity test values likewise have to be correlated with a bacteria challenge test.

The tests (water intrusion test and diffusion test) are in practice carried out exclusively with the aid of what is called the pressure drop measurement method in the manner described below.

For both tests, a prior art filter device can be used, as is shown diagrammatically in FIG. 1, with a container 1 comprising a filter housing 2 and a filter material 3 (for example a sterile filter candle) arranged in said housing. The filter device further comprises lines 4, 5 and 6, and valves or shut-off cocks 7, 8 and 9.

In the water intrusion test of hydrophobic filter elements, the container 1 is flooded with water via line 4 until the filter element 3 (e.g. the filter candle) is completely surrounded by water.

Thereafter, the inflow of water is maintained, with the valve 8 closed, until the pressure of the air enclosed above the filter candle 3 has reached the value of the inflowing water. Valve 7 is then closed. At this time, there is a two-component system of air and water in the inflow space between the filter housing 2 and the filter candle 3, the compressed air exerting a pressure on the (noncompressible) water. The force exerted in this way on the water now has the effect that the water gradually penetrates into the pores of the (inherently hydrophobic) membrane of the filter candle 3. As a result of the penetration of the water into the pore structure of the membrane, the level of the water in said two-component system drops and the volume of the enclosed air increases, with the pressure decreasing.

The diffusion test of hydrophilic filters leads to the same result in a different way. Here, the container 1 is likewise flooded with water via line 4 until the filter candle 3 is completely surrounded by water. With the valve 8 closed and the valve 9 opened, water is admitted until the filter candle has been completely permeated by water for a specific time, this water being removed from the container 1 via line 6. Thereafter, the water located in the inflow space between filter housing 2 and filter candle 3 is drained off via line 4 and, after removal of the water, valve 7 is closed. The container 1 is then subjected to compressed air via the line 5. In this way, a two-component system of air and water is again created, the compressed air exerting a pressure on the water located in the pores of the membrane of the filter candle 3. As long as the pressure of the air is insufficient to displace the liquid from the pores, some of the air will penetrate into the water in the pores and diffuse through the filled pores to the sterile side of the membrane. In this way, the pressure in the space between the filter housing 2 and the filter candle 3 likewise falls.

The change in pressure, i.e. the generated pressure gradient, can be determined in both test methods by means of a high-precision pressure drop measurement. The pressure drop can be converted, using Boyle's law, into a change in volume and thus into a flow value. Two ways of determining the diffusion or flow values with the aid of the pressure drop measurement method have established themselves on the market, namely the conventional pressure drop measurement method and what is called the forward flow method.

In the conventional pressure drop measurement method, the total pressure drop which arises in the two-component system during the entire test time is measured and, with the gas volume present at the start of the pressure drop measurement, is converted, using Boyle's law, to a flow value of the gas.

In the forward flow method, the pressure drop required for determining the integrity values is divided into a large number of small individual pressure drops. The method is carried out in the manner described above, with the difference that when a predetermined pressure drop value has been reached, gas from a gas reservoir with known pressure and volume is fed into the measurement system in the quantity which is needed to ensure that the pressure is brought back to the initial pressure which was present at the start of the measurement.

To determine the change in volume and thus the flow value, the individual compressed air portions are determined and added together. In the case of the water intrusion test of hydrophobic filters, the system has to be completely flooded with water so that a pressure drop can form only in the subsequently delivered gas volume.

In the forward flow method, the necessary flow value is likewise determined using Boyle's law.

The described measurement methods of the prior art have the advantage that the measurement of a pressure drop can be carried out very accurately with the available pressure sensors. Moreover, the pressure drop measurement is simple to carry out from the point of view of control technology and process technology.

Against these advantages, however, there are considerable disadvantages which ensue from the laws of physics. The measurement methods use gases as measurement medium and are therefore very much dependent on the thermodynamics of the gases. As a result, the measurement methods are very sensitive to environmental influences, such as temperature variations, and to the very slightest leakage of the system. In addition, the volume from which the measurement values are determined must be very accurately determined.

A further serious disadvantage lies in the fact that during the measurement the pressure in the system is not constant. This leads to undesirable distortion of the test results because of the reduction in the transmembrane pressure during the test time.

Finally, another disadvantage of the known measurement methods is that a relatively long measurement time is needed to ensure the highest possible accuracy and reliability of the test results. If this measurement time is not observed, the succinctness and precision of the measurement results fall considerably.

It is therefore an object of the present invention to make available a method for testing the integrity of filter elements, in particular sterile filters, which does not have the disadvantages of the known measurement methods.

It is in particular an object of the present invention to make available a method for testing the integrity of filter elements which is influenced as little as possible by changing environmental conditions, which can be carried out under constant pressure conditions (in order to avoid the system-related inaccuracy of the measurement in conventional methods caused by the test pressure changing during the measurement, and the associated distortion of the results) and which takes less time than conventional test methods.

SUMMARY OF THE INVENTION

This object is achieved by the embodiments of the present invention which are characterized in the claims.

The present invention is based on the recognition that the aforementioned problems can be solved by the fact that in the measurement method according to the invention the flow is no longer determined using Boyle's law to convert a pressure drop measured in a gas volume, but by direct measurement of a flow of liquid. The method according to the invention is thus based on direct measurement of the mass flow of a liquid, and this affords a number of advantages.

The liquid whose mass flow is measured, in most cases water, is a substance which is not compressible in the pressure range under consideration. Thus, all the environmental influences disrupting a measurement of a gas do not apply. The fact that a liquid, in particular water, has a substantially higher specific heat content compared to gases means that the system is substantially more thermally stable against fluctuating environmental conditions. The very slightest leakage of the system is not appreciable or is appreciable only to an insignificant extent. The technology according to the invention allows the measurement to be conducted at a system pressure which is constant during the measurement period. Moreover, the required test time can be significantly shortened using the method according to the invention.

When testing hydrophobic filters using the water intrusion test, an additional factor is that the liquid whose mass flow is to be measured is the very substance which in the final analysis is directly responsible for the capillary depression on a nonwettable surface, i.e. the hydrophobic membrane, and thus for the intrusion into the pores of the hydrophobic membrane. Thus, all the previously required conversions between the mass of the measured gas flow and the correlated mass of the amount of liquid which has penetrated into the membrane are no longer necessary.

The measurement of the liquid mass flow which is to be conducted in the method according to the invention can be carried out in a manner known per se and is not limited in any particular way. Particularly suitable methods in the method according to the invention are the hot-wire measurement method and the Coriolis measurement method, the latter being more cost-intensive than the former but permitting an extremely accurate measurement of the mass flow of the liquid.

A common feature of both methods is that they are methods which permit direct measurement of a liquid mass flow, and the devices required for them can be accommodated in compact measurement cells. Thus, both methods are highly suitable for testing the integrity both of hydrophobic filter materials and also of hydrophilic filter materials.

The measurement of the mass flow of the liquid takes place in a measurement cell, both measurement cell types (i.e. measurement cells for the hot-wire method and the Coriolis method) each having an inlet and an outlet for the liquid medium to be measured. The measurement values which are determined can be output in analog form (e.g. as 4–20 mA signal) or in digital form (e.g. in the form of a corresponding RS-232/RS-485 signal).

Both mass flow measurement cells have the advantage that they can also be sterilized for example by means of pure steam at a temperature of 121° C. Therefore, they can themselves be integrated into sterile systems, in the manner they are used in the pharmaceutical industry.

DETAILED DESCRIPTION OF THE INVENTION

Although the integrity test of hydrophobic and hydrophilic filter materials in accordance with the method of the present invention follows the same principle, it is conducted in a different way, so that both procedures are explained in detail below.

Figure 1:
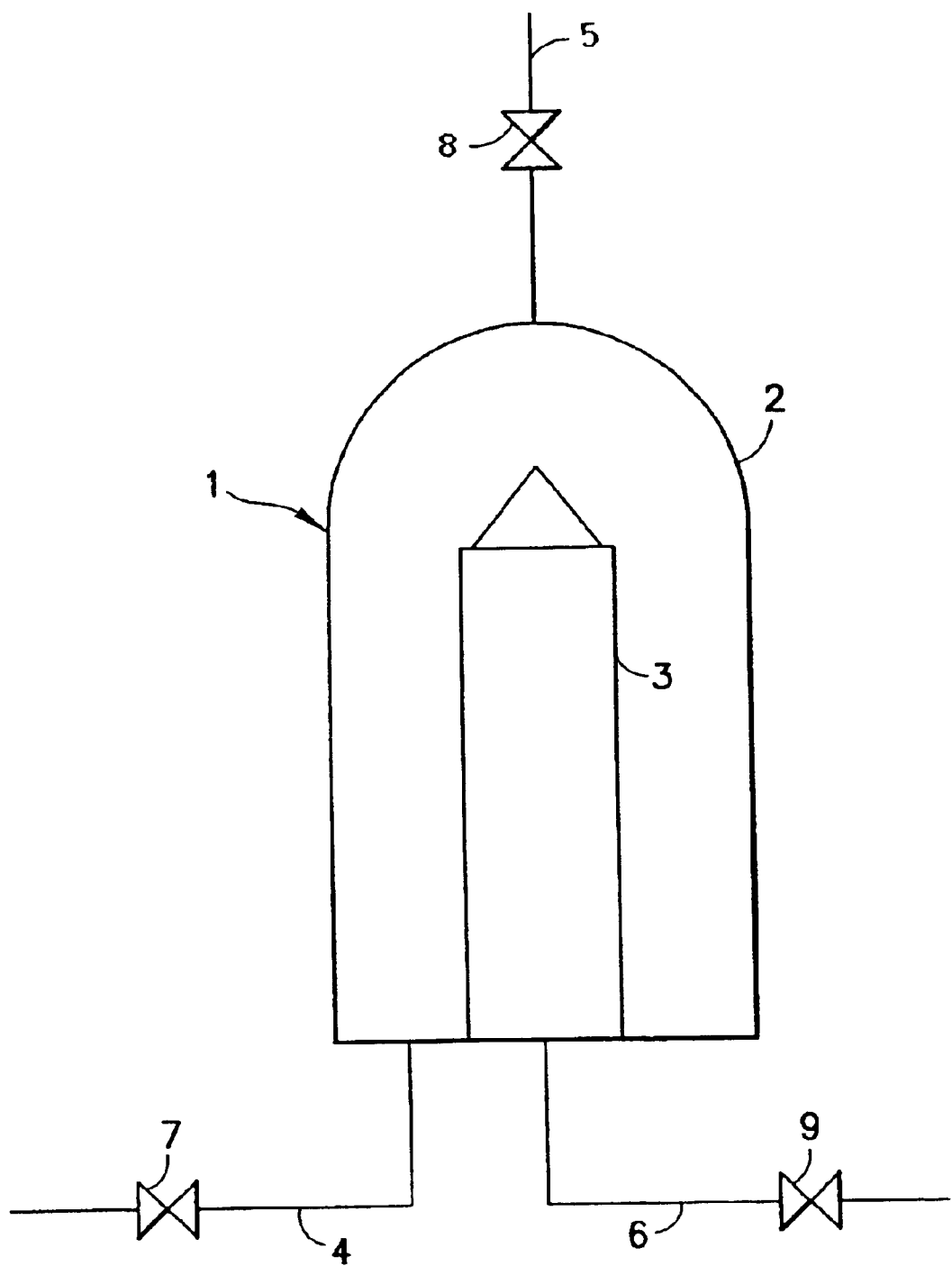
FIG. 1 is a diagrammatic illustration of the prior art filter device.
Figure 2:
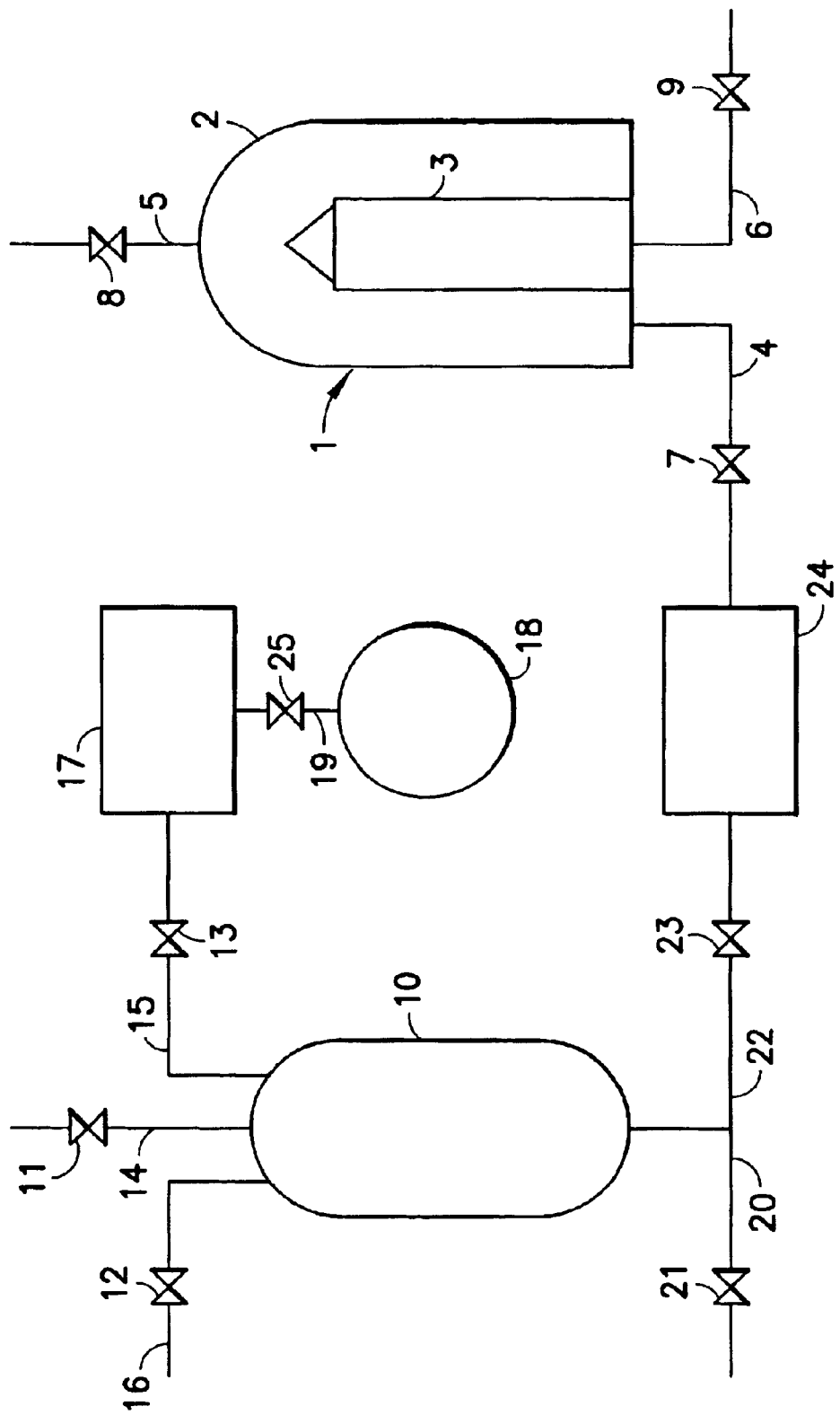
FIG. 2 shows a diagrammatic measurement arrangement for testing the integrity of hydrophobic filters in accordance with the method of the present invention.

First, referring to FIG. 2, testing the integrity of a hydrophobic filter material using the water intrusion test is described.

The measurement arrangement comprises a container 1 with a filter housing 2 and a filter element 3 arranged therein, for example a filter candle, whose filtering surface is made of a hydrophobic microfiltration membrane for sterile filtration. The measurement arrangement further comprises a pressure-resistant feed tank 10 with a capacitive level probe and a temperature measurement probe, a pressure-regulating station 17 for regulating the gas pressure, a compressed gas source 18, and a flow meter cell 24 with measurement transducers for pressure and flowrate. The constituent parts of the measurement arrangement are interconnected, in the manner shown in FIG. 2, by pressure-resistant lines (4, 5, 6, 14, 15, 16, 19, 20, 22), with valves (7, 8, 9, 11, 12, 13, 21, 23, 25) arranged in the lines at the positions shown.

At the top of the feed tank 10 there are a line 14 with membrane valve 11 for filling the feed tank 10 with WFI (water for injection, a high-purity pyrogen-free water with a surface tension of at least 70 dyn/cm$^2$); a line 15 with proportional pressure regulator valve 13 for connecting the feed tank 10 to the pressure-regulating station 17 with which the pressure of the compressed gas (mostly compressed air) required for the method is regulated; and a line 16 with a safety valve 12. The pressure-regulating station 17 is connected to a compressed gas source 18 via lines 19 with valve 25. From the bottom of the feed tank 10, a line leads to a T-piece from which two lines branch off, namely line 20 with valve 21 for emptying the feed tank 10, and line 22 with valve 23 leading to the flow meter cell 24. The flow meter cell 24 is connected to the container 1 via line 4 and valve 7. This container 1 has, at the top, a line 5 with valve 8 for evacuating air from the container 1. A medium delivered to the container 1 via line 4 can leave the container 1 on the inflow side (retentate side) of the filter element 3, for example a filter candle, via line 5 when the valve 8 is open, or, when the valve 5 is closed and the valve 9 open, can leave, only after it has passed the filter element 3, via line 6 which is located on the clean side (filtrate side) of the filter element 3.

The method is described below with a filter candle as the filter element, and with air as the gaseous medium.

At the start of the measurement, the feed tank 10 is filled with WFI via line 14. Thereafter, the valves 11 and 12 are closed, and compressed air from the compressed air source 18 is fed to the feed tank 10 via the proportional pressure regulator valve 13. With the valve 21 closed and the valve 23 open, the overpressure generated in the feed tank 10 conveys the pressurized WFI via the two measurement transducers for pressure and flow into the flow meter cell 24 and through the opened valve 7 into the inflow space of the container 1, the air relief or shut-off valve 8 in the top part of the container 1 being opened. In the container 1, the liquid rises until the liquid level has ascended into the air relief or shut-off valve 8. The air relief or shut-off valve 8 is then closed or is designed so that it closes automatically at this moment.

As soon as the test pressure in the system has been reached, the so-called stabilization phase begins. The pressure prevailing in the system is increased so that the water begins to penetrate into the pores of the hydrophobic membrane. This pressure is referred to as the operating pressure or test pressure. The system is now at the actual test pressure which is maintained constant throughout the stabilization time (and the subsequent measurement phase).

As soon as the predetermined actual test pressure is reached in the system, the stabilization time begins to run.

Throughout the stabilization time, the corresponding water flow is already determined in the flow meter cell 24 and recorded. If the flow measured during the stabilization phase exceeds a limit value set by the filter manufacturer, the method will not proceed to the measurement phase. Instead, the method is terminated at this point and a corresponding error message is generated, which means that the filter material or membrane is no longer integral.

Once a virtually constant flow has been established in the stabilization phase, the actual measurement phase begins. During the measurement phase, the system is at the actual test pressure.

In the method according to the present invention, the test time can be kept very short. In principle, a few seconds suffice for testing the integrity of the filter material. For practical reasons, and to permit a longer recording of the test values, it is advantageous for the test time to be set at approximately 10 seconds to 2 minutes; a test time of 60 seconds has proven advantageous in practice. After the measurement time has elapsed, the system is emptied.

When the container 1 has completely emptied and the pressure in the system has completely gone, the sequence of the method according to the invention for testing the integrity using the water intrusion test has ended.

Figure 3:
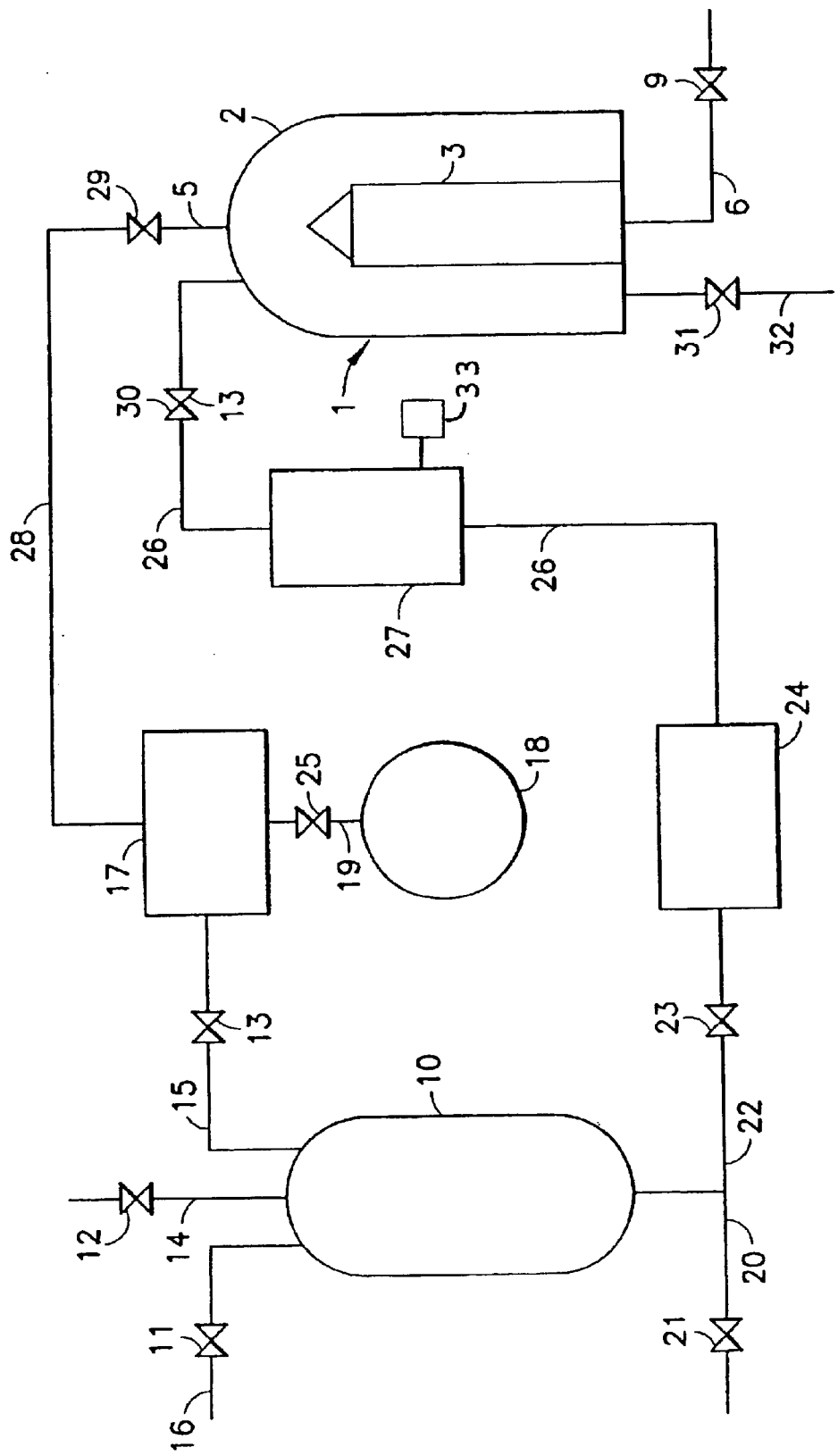
FIG. 3 shows a diagrammatic measurement arrangement for testing the integrity of hydrophilic filters in accordance with the method of the present invention.

Testing the integrity of hydrophilic filter elements using the diffusion test in the method according to the invention is carried out with a measurement arrangement which is shown diagrammatically in FIG. 3 and which has been modified and added to in relation to the measurement arrangement in FIG. 2.

As is shown in FIG. 3, the measurement arrangement for conducting the diffusion test likewise comprises a container 1 with a filter housing 2 and at least one filter element 3 which is arranged in the latter and whose filter material is made from a hydrophilic microfiltration membrane for sterile filtration. Moreover, the measurement arrangement also comprises a pressure-resistant feed tank 10, a pressure-regulating station 17, a compressed gas source 18, a flow meter cell 24, and lines and valves, as are described in FIG. 2.

In addition, and as a modification, the measurement arrangement according to FIG. 3 comprises an intermediate container 27 which is connected upstream via line 26 to the flow meter cell 24 and is connected downstream via the valve 30 to the top part of the container 1. In addition, the pressure-regulating station 17 is also connected to the top part of the container 1 via line 28 with valve 29. The inflow space of the container 1 can be filled or emptied via line 31 and valve 32.

Before the start of the integrity test using the diffusion test, the filter element 3, for example the hydrophilic microfiltration membrane of a filter candle, is wetted in a manner known per se with the liquid measurement medium, in this case water for injection.

The feed tank 10 is then filled with water for injection via line 14. Thereafter, the valves 11, 12 and 29 are closed and the feed tank 10 is acted upon with compressed gas from the compressed gas source 18 via the proportional pressure regulator valve 13, i.e. in the case described here with compressed air. With the valves 21 and 30 closed and the valve 23 open, the overpressure generated in the feed tank 10 conveys the pressurized water for injection via line 22 through the two measurement transducers for pressure and flow, first through the flow meter cell 24 and then via line 26 into the intermediate container 27. In the intermediate container 27, the liquid level then begins to rise until the pressure of the air enclosed in the top part of the intermediate container 27 corresponds to the pressure in the feed tank 10. In parallel with this, and via the line 28 and the opened valve 29, the inflow side of the container 1 is subjected to the same air pressure as prevails in the feed tank 10. The same pressure now prevails throughout the system, namely the test pressure, and the pressure build-up phase is thus ended.

At the start of the stabilization phase which now follows, the valve 29 is closed and the valve 30 opened. Since the system is in a stable pressure state, the air escaping to the clean side by diffusion of said air through the water-filled pores of the filtration membrane of the filter candle 3 leads to a pressure drop in the inflow space of the filter housing 2 and in the intermediate container 27.

The pressure drop which takes place in this way is now compensated by means of the water continuously flowing from the feed tank 10 into the intermediate container 27, so that the pressure in the system is always constant. Since the water between the feed tank 10 and the intermediate container 27 is routed through the measurement transducers in the flow meter cell 24, the air escaping by diffusion can be exactly determined by way of the amount of liquid which is needed to maintain the pressure in the system constant.

During the whole stabilization time, which lasts about 10 minutes in the water intrusion test and is variable in the diffusion test, for example 1 to 5 minutes, the corresponding flow is already determined and recorded. If the flow measured during the stabilization phase is too high, the method will not proceed to the measurement phase. In this case the method is terminated and a corresponding error message is generated, which means that the filter material or membrane is no longer integral.

After a constant flow has been established in the stabilization phase which does not exceed a predetermined value, the actual measurement phase begins. During the measurement phase too, the system is at the constant test pressure.

The time needed in the diffusion test moves within the same range as is indicated above for the water intrusion test.

After the measurement time has elapsed, the system is relieved from pressure. As soon as the container 1 is relieved from pressure and the pressure in the rest of the system has likewise completely gone, the sequence of the method according to the invention for testing integrity with the aid of the diffusion test is ended.

In the measurement arrangements which are shown diagrammatically in FIG. 2 and FIG. 3, one container 1 is described. However, with the method according to the invention, it is also possible for two or more containers 1 with filter elements to be tested simultaneously. For this purpose, a plurality of containers 1 simply need to be integrated in an analogous manner into the system. Moreover, each container 1 can have more than one filter element, for example a plurality of filter candles. In the test method, the individual containers 1 with the filter elements contained in them can then be tested in succession in the manner which has been described. However, in the case of a plurality of containers 1, the stabilization phase is advantageously carried out simultaneously for all containers 1, and the valves are thereafter closed in such a way that, in the actual measurement, one container 1 is tested at a time. This has to the additional advantage that the length of the stabilization time has to be used up only once, and thereafter the measurement of the integrity of the individual filter elements can be carried out very quickly.

The present invention is now explained in more detail using examples which are not in any way intended to be limiting.

EXAMPLE 1

A filter candle of type Sartofluor GA 10" from Sartorius AG, with a hydrophobic PTFE microfiltration membrane having an average pore diameter of 0.2 $\mu$m and a total filter area of 0.8 $m^2$, and accommodated in a filter housing, was tested for integrity using the water intrusion test. The manufacturer indicates a maximum flow of 1.3 ml/min at a pressure of 2500 mbar for an integral filter candle. The test was conducted using a measurement arrangement shown in FIG. 2 and in the manner described for the water intrusion test. A capacitive level sensor 0–100% and a temperature sensor Pt 100 for 0–150° C. (class A) were integrated in the feed tank.

The flow meter cell comprised a pressure sensor for 0–4000 mbar (class 0.2% FS, i.e. Full Scale) and a mass flow meter cell (measurement transducer for flow) for 0–200 ml (class 0.1% FS). The flow meter cell further comprised store-programmable control (SPC) software and a man-machine interface (MMI) of the touchscreen type.

Both apparatus parts are configured as a single unit. The SPC/MMI combination is fitted both with analog and with digital inputs/outputs (analog: 4–20 mA; digital: RS-232/RS-485 signal).

After filling the feed tank with water for injection, the tank was subjected to compressed air and, before the start of the stabilization phase, the geostatic pressure was manually programmed in. The pressure was then increased by 100 mbar (the operating pressure) so that the system was set at an actual test pressure of 2600 mbar.

The flow of water through the flow meter cell 24, arising as a result of the capillary depression, was measured at the same time, and was determined at 0.1 ml/min. After the flow had reached a constant value, the stabilization phase was continued for a further 10 min to completion.

The measurement phase was then started, i.e. the flow was measured for 60 seconds and recorded. The flow of water through the flow meter cell in the measurement phase was constant at 0.09 ml/min. As the value was below the flow which the filter candle manufacturer had indicated for an integral filter candle, i.e. 1.3 ml/min, the filter candle was assessed as integral. At the end of the measurement phase, the system was relieved of pressure and emptied. The testing of the filter candle for integrity using the water intrusion test within the method according to the invention was thus ended.

EXAMPLE 2

In this example, a filter candle of type Sartopore 10" from Sartorius AG, with a hydrophilic microfiltration membrane based on polyether sulfone (PESU) having an average pore diameter of 0.2 $\mu$m and a total filter area of 0.6 $m^2$, and accommodated in a filter housing, was tested for integrity using the diffusion test. The manufacturer indicates a maximum flow of 16 ml/min for the integral filter candle at a pressure of 2500 mbar.

The test was conducted using a measurement arrangement shown in FIG. 3 and in the manner described above for the diffusion test. The feed tank 10 and the flow meter cell 24 were identical to those described in Example 1.

Before starting to test the integrity using the diffusion test, the filter element was wetted in a known manner with water for injection. The feed tank 10 was then filled with water for injection and subjected to an air pressure of 2500 mbar.

This pressure was generated by suitable valve control throughout the system (feed tank 10, intermediate container 27 and container 1) and was 2500 mbar. Valve 29 was then closed. At this test pressure, the water flow through the flow meter cell 24 (and thus the air flow through the filter material resulting from the diffusion of the air through the water-filled pores of the membrane) was measured at 15 ml/min. After the flow had reached a constant value, the stabilization phase was continued until the end of the preprogrammed stabilization time of 4 minutes. The measurement phase was then started, i.e. the flow was measured for 60 seconds and recorded. The flow of the water through the flow meter cell in the measurement phase was a constant 13 ml/min. Since the value was below the limit which the manufacturer had indicated for an integral filter candle, namely 16 ml/min, the filter candle was assessed as integral. At the end of the measurement phase, the system was relieved of pressure and emptied. The testing of the filter candle for integrity using the diffusion test within the method of the present invention was thus ended.

As has been shown above, filter elements, in particular sterile filters, can be tested for their integrity using the method according to the invention, and the water intrusion test illustrated in FIG. 2 is not influenced by environmental changes such as temperature variations. In the diffusion test method shown in FIG. 3, the negative environmental effect is very largely compensated by a measurement of the temperature of the gas in the housing of the intermediate container 27 with a temperature sensor 33 and by a corresponding temperature compensation in accordance with Gay-Lussac's law. A constant pressure is present in the system throughout the measurement phase, so that no distortions of the measurement result can be caused by changing pressure in the measurement system. In addition, the method according to the invention requires much less time than conventional measurement methods.

List of Reference Numbers 1 container
2 filter housing
3 filter element
4 line (housing inlet)
5 line
6 line (housing outlet)
7, 8, 9 valves (shut-off cocks)
10 pressure-resistant feed tank with capacitive level probe and temperature measurement probe
11 membrane valve
12 membrane valve (safety valve)
13 membrane valve (proportional pressure regulator valve)
14 line for filling the feed tank
15 line leading to the pressure-regulating station
16 line leading to the safety valve
17 pressure-regulating station for gas pressure
18 compressed gas source
19 line
20 line
21 valve
22 line
23 valve
24 flow meter cell with measurement transducers for pressure and flow
25 valve
26 line
27 intermediate container
28 line
29 valve
30 valve
31 line
32 valve
33 temperature sensor

What is claimed is:

1. A method for conducting an integrity test of filter elements, comprising the steps of:

setting up a measurement arrangement comprising at least one container, which has a filter housing with an inlet and an outlet for a fluid and, arranged between these and separating them, at least one filter element, which is a hydropholic membrane filter, the container on the inflow side being connected via pressure-resistant lines to a flow meter cell for a liquid aqueous medium, to a pressure-resistant feed tank, to a pressure-regulating station for a gaseous medium, to a compressed gas source and, if appropriate, to an intermediate container;

wherein the container, in the top part on the inflow side, has a line with an air relief or shut-off valve, and, in the bottom part, is connected to the flow meter cell, to the pressure-resistant feed tank, to the pressure-regulating station, and to the compressed gas source;

the pressurized liquid aqueous medium from the feed tank is introduced through the flow meter cell and into the inflow space of the container until the whole inflow space is filled with the liquid aqueous medium, whereupon the shut-off valve at the top of the container is closed;

thereafter the gas pressure in the system is increased by an operating pressure which is sufficient to ensure that the liquid aqueous medium begins to penetrate into the pores of the hydrophobic filter element;

the total pressure made up of geostatic pressure and operating pressure is maintained constant;

the flow of the liquid aqueous medium through the flow meter cell is measured at the constant total pressure in a stabilization phase until a constant flow through the flow meter cell is established;

after completion of the stabilization phase, the flow of the liquid aqueous medium through the flow meter cell in a measurement phase is measured at constant pressure and recorded; and the flow value obtained is compared with the flow value indicated or determined for the integral filter element.

2. The method as claimed in claim 1, in which the hydrophobic membrane filter is a microporous membrane filter.

3. The method as claimed in claim 2, in which the microporous membrane filter is a sterile filter.

4. The method as claimed in claim 1, in which the measurement arrangement comprises more than one container.

5. The method as claimed in claim 4, in which each container has more than one filter element.

* * * * *